United States Patent
Satre et al.

(10) Patent No.: US 10,914,184 B2
(45) Date of Patent: Feb. 9, 2021

(54) TURBINE FOR A TURBINE ENGINE

(71) Applicant: Safran Aircraft Engines, Paris (FR)

(72) Inventors: Antoine Frederic Jean Satre, Moissy Cramayel (FR); Simon Jean-Marie Bernard Cousseau, Moissy-Cramayel (FR); Erwan Perrot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 260 days.

(21) Appl. No.: 16/104,531

(22) Filed: Aug. 17, 2018

(65) Prior Publication Data
US 2019/0063234 A1     Feb. 28, 2019

(30) Foreign Application Priority Data
Aug. 18, 2017 (FR) .................................. 17 57737

(51) Int. Cl.
| | |
|---|---|
| *F01D 5/30* | (2006.01) |
| *F01D 5/32* | (2006.01) |
| *F01D 11/00* | (2006.01) |
| *F01D 11/02* | (2006.01) |
| *F01D 5/06* | (2006.01) |

(Continued)

(52) U.S. Cl.
CPC ........... *F01D 5/3007* (2013.01); *F01D 5/147* (2013.01); *F01D 5/30* (2013.01); *F01D 5/3015* (2013.01); *F01D 5/326* (2013.01); *F01D 11/001* (2013.01); *F01D 11/003* (2013.01); *F01D 11/02* (2013.01); *B64D 27/10* (2013.01); *F01D 5/066* (2013.01); *F05D 2240/55* (2013.01);

(Continued)

(58) Field of Classification Search
CPC .......... F01D 5/3007; F01D 5/147; F01D 5/30; F01D 5/3015; F01D 5/326; F01D 5/066; F01D 11/001; F01D 11/003; F01D 11/02; F05D 2240/55; F05D 2240/80; F05D 2250/13; F05D 2250/292; B64D 27/10
See application file for complete search history.

(56) References Cited

U.S. PATENT DOCUMENTS

| | | | |
|---|---|---|---|
| 3,047,268 A | | 7/1962 | Leavitt |
| 3,378,230 A | * | 4/1968 | Toomey .................. F01D 5/323 416/221 |

(Continued)

FOREIGN PATENT DOCUMENTS

| | | |
|---|---|---|
| EP | 2 562 355 A2 | 2/2013 |
| FR | 2 933 442 A1 | 1/2010 |

(Continued)

*Primary Examiner* — Nathaniel E Wiehe
*Assistant Examiner* — Eric A Lange
(74) *Attorney, Agent, or Firm* — Blank Rome LLP

(57) ABSTRACT

A turbine includes a stator and a movable rotor, rotating around an axis, in relation to the stator. The rotor comprises at least one disc, the radially outer periphery of which comprises cavities. The rotor further includes blades, each having a blade root axially engaged in a cavity of the disc so as to radially hold the blade on the disc. At least one of the blade roots has an axially flaring shape, with the corresponding cavity having a matching shape so as to axially lock the blade root in the cavity in a first axially oriented direction. Locking means lock the blade root in the cavity in a second axially oriented direction, opposite the first direction.

11 Claims, 3 Drawing Sheets

(51) Int. Cl.
*F01D 5/14* (2006.01)
*B64D 27/10* (2006.01)
(52) U.S. Cl.
CPC ...... *F05D 2240/80* (2013.01); *F05D 2250/13* (2013.01); *F05D 2250/292* (2013.01)

(56) References Cited

U.S. PATENT DOCUMENTS

2016/0032739 A1* 2/2016 Sekihara ............... F01D 5/3007
                                                                  60/805
2016/0061058 A1* 3/2016 Young .................... F01D 25/32
                                                                 416/95

FOREIGN PATENT DOCUMENTS

| FR | 2 973 453 A1 | 10/2012 | |
|----|--------------|---------|---|
| FR | 2978793 A1 * | 2/2013 | ............. F01D 5/084 |
| GB | 2 436 132 A | 9/2007 | |

\* cited by examiner

TURBINE FOR A TURBINE ENGINE

CROSS-REFERENCE TO RELATED APPLICATIONS

This application claims the benefit of French Patent Application No. 1757737, filed on Aug. 18, 2017, the contents of which are incorporated herein by reference.

FIELD

The present invention relates to a turbine for a turbine engine, such as an aircraft turbojet engine or a turboprop engine.

BACKGROUND

An aircraft turbine engine conventionally includes, from the upstream towards the downstream direction, in the direction of the gas flow, a fan, a low-pressure compressor, a high-pressure compressor, a combustion chamber, a high-pressure turbine and a low-pressure turbine. The high-pressure turbine is rotationally coupled to the high-pressure compressor by a first shaft, so as to form a high-pressure body. The low-pressure turbine is rotationally coupled to the fan and to the low-pressure compressor by a second shaft, so as to form a low-pressure body.

The low-pressure turbine generally comprises several impellers, each comprising a disc, on the outer periphery of which, engagement cavities for blade roots are formed, regularly distributed around the axis of the disc.

The cavities are generally machined by broaching. According to this method, the cutting tool used is a straight broach with a series of teeth spaced apart from each other longitudinally Each cavity is created by straight movement of the broach in relation to the disc, so as to machine, tooth by tooth, the outer periphery of the disc. The shape and size of the teeth vary from one end of the broach to the other and those of the last tooth to machine the disc must correspond to those of the cavity. Several successive broaches are generally used in order to gradually approximate, broach by broach, the final section of the cavity to be obtained. The operation is repeated for each cavity to be created.

In this manner, cavities are created that have a constant section over the entire axial length of the cavity.

Document FR 2 933 442 discloses a rotor disc of this kind, wherein each blade root is held axially in a cavity of the disc by suitable means. In particular, a retaining flange fixed on the disc is adapted to bear against each blade root, so as to lock the blade root in the cavity, in a first axial direction. Furthermore, a seal is held integral with the blade by means of a blade hook, said ring being able to bear on the disc so as to lock the blade in a second axial direction, opposite to the first direction. The blade root is thus held axially in the corresponding cavity, in both axial directions.

A structure of this kind requires many components and/or a large volume of material to perform such a locking or axial holding function for maintaining the blade root in the corresponding cavity, which increases the mass of the turbine and is unfavourable to the efficiency of the turbine engine.

SUMMARY OF THE INVENTION

The invention aims to solve this drawback, simply, reliably and inexpensively.

For this purpose, the invention relates to a turbine for a turbine engine, for instance a turbojet engine or a turboprop engine of an aircraft, having a stator and a movable rotor, rotating around an axis, in relation to the stator, wherein the rotor comprises at least one disc, the radially outer periphery of which comprises cavities, wherein the rotor furthermore comprises blades each having a blade root axially engaged in a cavity of the disc so as to radially hold the blade on the disc, characterised in that at least one of the blade roots has an axially flaring shape, with the corresponding cavity having a matching shape so as to axially lock the blade root in the cavity, in a first axially oriented direction, wherein locking means lock the blade root in the cavity in a second axially oriented direction, opposite the first direction.

The blade root is thus locked in the corresponding cavity with a limited number of components, thereby lightening the turbine engine rotor.

Owing to its flared shape, the blade root can therefore comprise side walls oblique in relation to the axial direction. Such oblique walls allow better distribution of the mechanical stresses by increasing the contact or abutment areas between blade root and the cavity.

In contrast, a radial shoulder would provide axial locking in the first direction, but would not effectively distribute mechanical stresses. The blade root may however comprise one or more shoulders and comprise side surfaces comprising areas solely oriented axially. The axial stresses are in this case taken up by the shoulders.

It is of course possible according to the invention to use both flared surfaces and shoulders.

The flared shape of the blade root means that its section decreases from upstream to downstream, or increases from downstream to upstream. Such an increase may be gradual, as in the case of oblique walls, or abrupt, as in the case of one or more shoulders.

The turbine is for instance a low-pressure turbine.

In at least a portion of the blade root and the cavity, the section along an orthogonal plane in the axial direction of the blade root and of the corresponding cavity gradually increases in the second axial direction.

Said portion may extend over at least 50% of the axial dimension of the blade root, preferably at least 80% of the axial dimension of the blade root.

At least a portion of the blade root and of the cavity may have an oblique side wall forming an angle included between 5° and 25° in relation to the axis.

Such a characteristic allows maximum uptake of the axial stress exerted on the blades.

The first direction may be oriented from upstream to downstream in the direction of gas circulation within the turbine, with the second direction being oriented from downstream to upstream.

The strength of the locking means is thus improved by having the greatest stresses being taken up by the flared shape of the cavity. The latter may be subject to high stresses in comparison to the other locking means.

The disc may comprise at least one connecting wall extending axially in the upstream or downstream direction, with the rotor comprising at least one ring attached to the connecting wall.

The ring may comprise lips interacting with a block of abradable material borne by the stator, so as to form a labyrinth-type seal.

The ring may axially bear on the blade root so as to lock the blade root axially in the cavity, in the second axial direction.

The ring thus forms the aforementioned locking means.

The ring bears for example against the upstream end of the blade root in relation to the direction of circulation of the gas flow.

The rotor may comprise at least one support seal axially integral with the blade, with the seal being adapted to bear against the disc so as to lock the blade root in the cavity, in the second axial direction.

The blade may comprise at least one hook, with the seal being held axially on the blade by the hook.

The seal is for example located downstream from the blade root and the cavity.

The seal is for example an annular seal, which may extend over the entire circumference, being split, or may be formed of several angular sectors, i.e. it may be sectorised.

The invention also relates to a turbine engine, such as for instance a turbojet engine or a turboprop engine, comprising a turbine of the above type.

The invention will be better understood and other details, characteristics, and advantages of the invention will appear on reading the following description given by way of non-limiting example and with reference to the accompanying drawings, in which:

DETAILED DESCRIPTION

Figure 2:
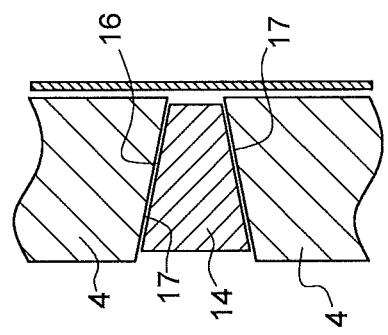
FIG. 2 is a sectional view along the line A-A in FIG. 1.
Figure 1:
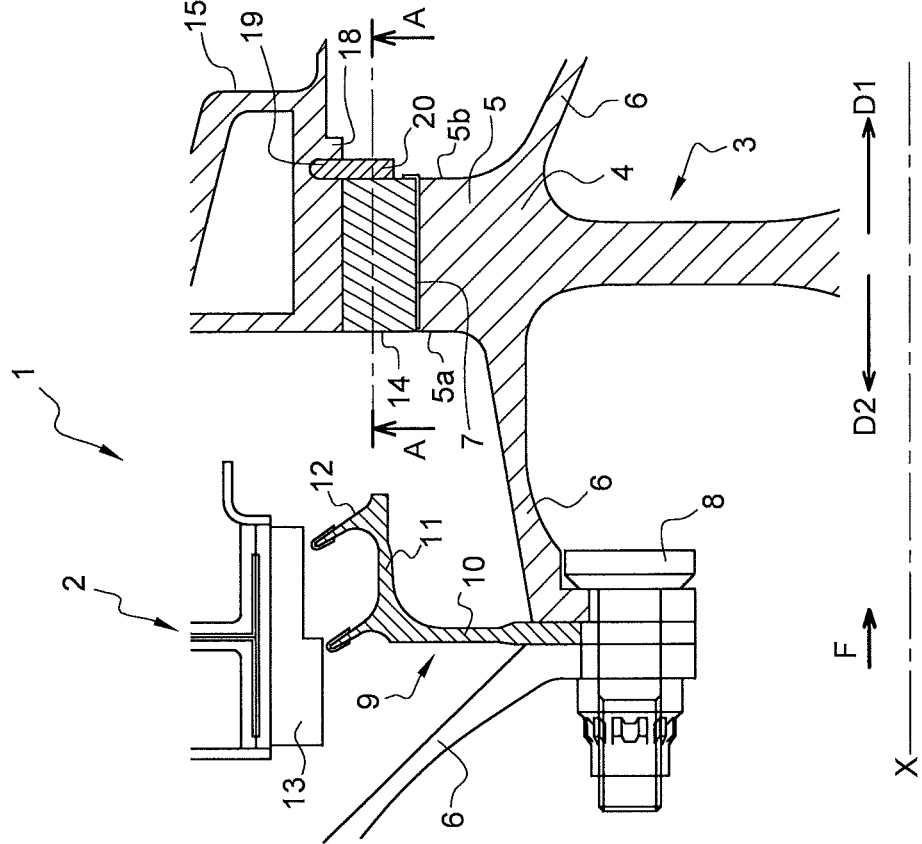
FIG. 1 is a cross-sectional axial view of a low pressure turbine according to a first embodiment of the invention.

FIGS. 1 and 2 illustrate a low or high-pressure turbine 1 of an aircraft turbine engine according to a first embodiment of the invention.

The turbine 1 comprises a stator 2 and a rotor 3 movable in rotation around an axis X, which is the axis of the turbine engine. In the remainder of the description, the terms "axial" and "radial" are defined by reference to the axis X. Furthermore, the terms "upstream" and "downstream" are defined by reference to the direction of circulation F of gas flow within the turbine.

The rotor 3 features a disc 4 comprising a rim 5 extending radially and cylindrical or conical connecting walls 6 extending axially upstream and downstream from the rim 5. The radially outer periphery of the rim 5 comprises cavities 7 opening radially outwards. The cavities 7 furthermore open axially in the upstream and downstream direction, respectively at an upstream radial wall 5a and a downstream radial wall 5b of the rim 5.

The rotor 3 may comprise several discs 4, connected to each other by means of bolts 8 on the connecting walls 6.

A ring 9 is fixed between the upstream connecting wall 6 of the disc 4 and the downstream connecting wall 6 of another disc 4, located directly upstream. The ring 9 comprises a portion extending radially 10 extended on its radially outer periphery by a cylindrical portion 11 extending axially downstream. Said cylindrical portion comprises lips 12 interacting with a block of abradable material 13 borne by the stator 2, so as to form a labyrinth seal.

The radial portion 10 is maintained between axial ends of the connecting walls 6 of the discs 4 which face each other, by means of the bolts 8.

In this embodiment, the downstream end of the cylindrical portion 11 is located at a distance from the flank of the disc 4. The mass of such a ring 9 is therefore limited. Moreover, by reducing the mass of the rotor and the mass borne in the disc-to-disc connection areas, the level of mechanical stresses observed in these disc-to-disc connecting area is reduced, thereby facilitating the dimensioning of these areas.

The rotor 3 furthermore comprises blades, whereby each blade conventionally comprises a radially inner blade root 14, a platform 15 and a vane extending radially outside the platform 15.

Each blade root 14 is mounted in one of the cavities 7 of the disc 4, with the sections of the cavity 7 and of the blade root 14 serving to radially hold the blade on the disc 4. A section of this kind is for example a dovetail section or a so-called fir-tree section, as is known per se.

According to the invention, each blade root 14 has a shape that flares axially in the upstream direction, i.e. becoming narrower in the downstream direction, with the corresponding cavity 7 having a matching shape so as to axially lock the blade root 14 in the cavity 7, in a first axial direction D1.

In particular, each blade root 14 comprises side walls 16 oblique in relation to the axial direction, with the section decreasing gradually and continuously from the upstream to the downstream direction, or increasing gradually and continuously from the downstream to the upstream direction.

In other words, each side surface 16 of the blade root 14 is in contact with a surface of the cavity 17 of the disc 4 over the entirety of said side surface.

Furthermore, the rotor 3 additionally comprises locking means that lock that blade root 14 in the cavity 7, in a second axially oriented direction D2, opposite the first direction D1.

More specifically, the blade platform 15 comprises at least one hook 18 delimiting a groove 19 in which an annular seal 20 is engaged. The seal 20 is located downstream from the blade root 14 and the cavity 7. The seal 20 may extend over the entire circumference, being split. In an alternative embodiment, the seal may be formed of several angular sectors, i.e. it may be sectorised.

The seal 20 is hence axially integral with the blade, with the seal 20 being furthermore adapted to bear against the downstream radial face 5b of the rim 5 of the disc 4, so as to lock the blade root 14 in the cavity 7, in the second axial direction D2.

The first direction D1 is oriented from upstream to downstream and the second direction D2 is oriented from downstream to upstream.

Figure 3:
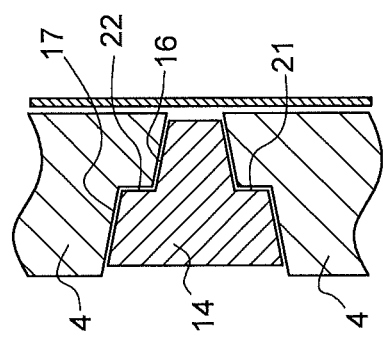
FIG. 3 is a view corresponding to FIG. 2, illustrating an alternative embodiment of the invention.

FIG. 3 illustrates an alternative embodiment that differs from that described while referring to FIGS. 1 and 2 in that the blade root 14 comprises at least one shoulder 21, with the cavity 7 comprising a shoulder 22 of matching shape. The shoulder 21 of the blade root 14 may or may not bear against the shoulder 22 of matching shape of the cavity 7, at the same time as the oblique areas 16, 17 of the side surfaces of the blade root 14 and of the cavity 7. In all cases, the axial locking of the blade root 14 in the cavity 7, in the first direction D1, is effected at least by the support of the oblique areas 16, 17 of the side surfaces of the blade root 14 and of the cavity 7.

In this way, the blade root 14 is locked in the corresponding cavity 7 with a limited number of components, thereby lightening the turbine engine rotor 3. Furthermore, use of oblique walls 16, 17 allows better distribution of the mechanical stresses by increasing the contact or abutment areas between blade root 14 and the cavity 7.

Figure 4:
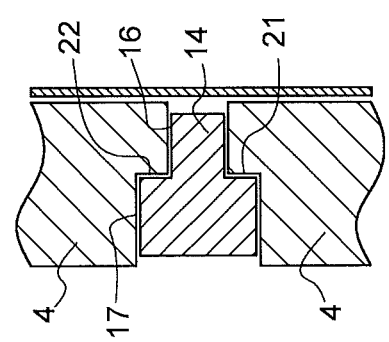
FIG. 4 is a view corresponding to FIG. 2, illustrating an alternative embodiment of the invention.

FIG. 4 illustrates another alternative embodiment that differs from that described while referring to FIG. 3 in that the blade root 14 comprises a shoulder 21 and is devoid of oblique areas; the side surfaces of the blade root 14 and of the cavity 7 thus comprise axially oriented areas.

The axial stresses are in this case taken up by the shoulder 21 of the blade root 14 and by the matching shoulder 22 of the cavity 7.

Figure 5:
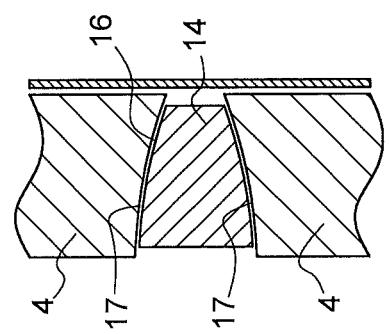
FIG. 5 is a view corresponding to FIG. 2, illustrating a further alternative embodiment of the invention.

FIG. 5 illustrates another alternative embodiment that differs from that described while referring to FIG. 2 in that the blade root 14 comprises rounded side surface 16 engaged in a cavity 7 of matching shape. The axial stresses are thus distributed along the rounded side surfaces 16.

Figure 6:
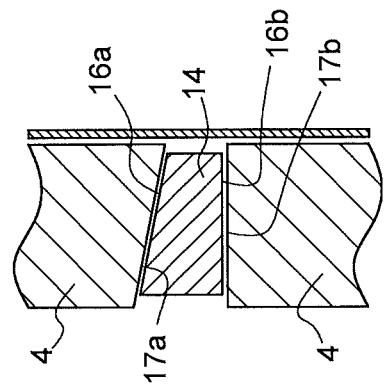
FIG. 6 is a view corresponding to FIG. 2, illustrating a further alternative embodiment of the invention.

FIG. 6 illustrates another alternative embodiment that differs from that described while referring to FIG. 2 in that the blade root 14 comprises a side surface 16a oblique in relation to the axial direction and an opposite side surface 16b, oriented in the axial direction, with the cavity 7 having side surfaces 17a, 17b of matching shapes. The axial stresses are thus distributed along the oblique surface 16a.

Figure 8:
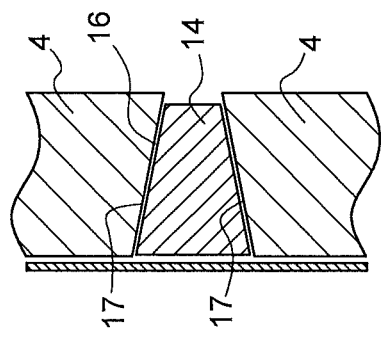
FIGS. 7 and 8 are views respectively corresponding to FIGS. 1 and 2, illustrating a second embodiment of the invention.
Figure 7:
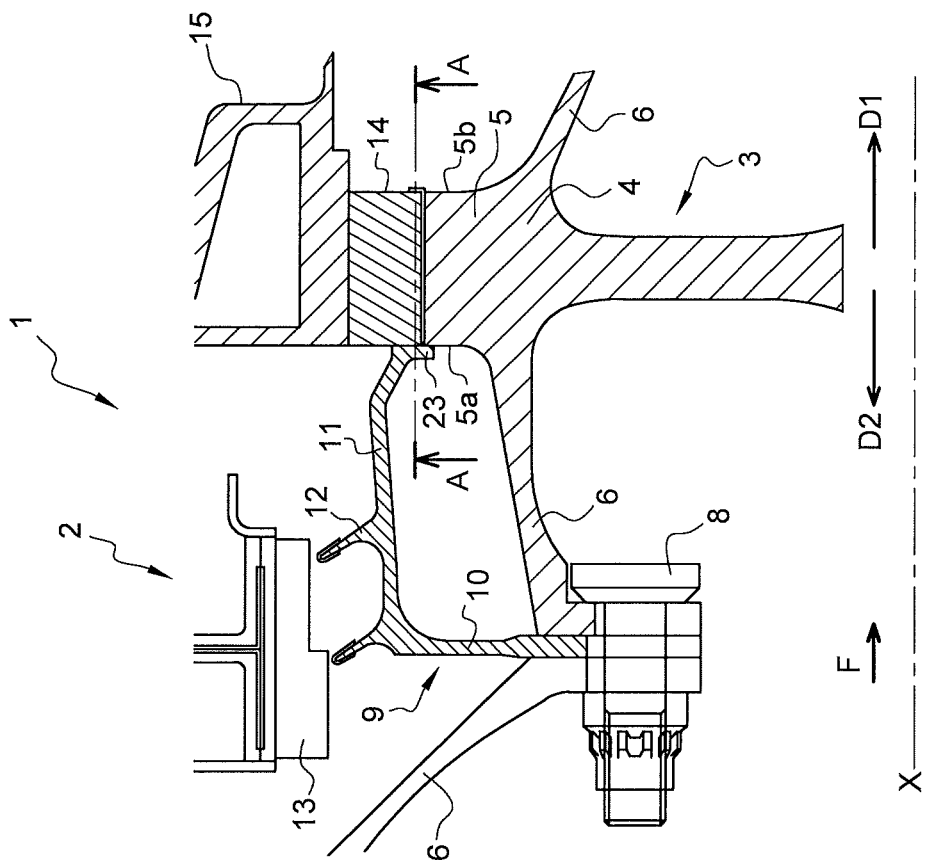

FIGS. 7 and 8 illustrate a second embodiment that differs from that disclosed while referring to FIGS. 1 and 2 in that the locking means in the second direction D2 are formed by the ring 9. The blades are devoid of the hook 18 and of the seal 20 accommodated therein.

In this embodiment, the cylindrical portion 11 of the ring 9 is extended in the downstream direction and the downstream end of said cylindrical portion is adapted to bear against the upstream ends of the blade roots 14, so as to lock each blade root 14 in the corresponding cavity 7, in the second direction D2.

The downstream end of the cylindrical portion 11 of the ring 9 may comprise an annular flange 23 extending inwards, said flange 23 serving to support the upstream ends of the blade roots 14.

Each blade root 14 can thus be locked in the first direction D1, by the flared side surfaces of the blade root 14 resting on the matching surfaces of the corresponding cavity 7 and, in the second direction D2, by the upstream end of the blade root 14 resting on the flange 23 of the ring 9.

The invention claimed is:

1. A turbine for a turbine engine, having a stator and a movable rotor, rotating around an axis, in relation to the stator, wherein the rotor comprises at least one disc, the radially outer periphery of which comprises cavities, wherein the rotor furthermore comprises blades each having a blade root axially engaged in a cavity of the disc so as to radially hold the blade on the disc, wherein at least one of the blade roots has an axially flaring shape such that a cross-section of the at least one of the blade roots increases across an axial length from a first longitudinal extremity to a second longitudinal extremity opposite the first longitudinal extremity and an area of a cross-section of the second longitudinal extremity is greater than an area of a cross-section of the first longitudinal extremity, with the corresponding cavity having a matching shape so as to axially lock the blade root in the cavity, in a first axially oriented direction, and wherein locking means lock the blade root in the cavity in a second axially oriented direction, opposite the first direction.

2. The turbine according to claim 1, wherein at least a portion of the blade root along an orthogonal plane in the axial direction of the blade root and a portion of the corresponding cavity gradually increase in the second axial direction.

3. The turbine according to claim 2, wherein said portion extends over at least 50% of the axial dimension of the blade root.

4. The turbine according to claim 3, wherein said portion extends over at least 80% of the axial dimension of the blade root.

5. The turbine according to claim 1, wherein at least a portion of the blade root and of the cavity has an oblique side wall forming an angle between 5° and 25° in relation to the axis.

6. The turbine according to claim 1, wherein the first direction is oriented from upstream to downstream in the direction of gas circulation within the turbine, and wherein the second direction is oriented from downstream to upstream.

7. The turbine according to claim 1, wherein the disc comprises at least one connecting wall extending axially in the upstream or downstream direction, and wherein the rotor comprises at least one ring attached to the connecting wall, with the ring comprising lips interacting with a block of abradable material borne by the stator, so as to form a labyrinth-type seal.

8. The turbine according to claim 7, wherein the locking means in the second axial direction are at least formed by the ring that bears axially on the blade root so as to lock the blade root axially in the cavity, in the second axial direction.

9. The turbine according to claim 1, wherein the locking means in the second axial direction includes the rotor, which comprises at least one support seal axially integral with the blade, with the seal being adapted to bear against the disc so as to lock the blade root in the cavity, in the second axial direction.

10. The turbine according to claim 8, wherein the blade comprises at least one hook, with the seal being held axially on the blade by the hook.

11. An aircraft turbojet or a turboprop, comprising the turbine according to claim 1.

* * * * *